US012535772B2

(12) United States Patent
Funakawa

(10) Patent No.: US 12,535,772 B2
(45) Date of Patent: Jan. 27, 2026

(54) TIMEPIECE COMPONENT, TIMEPIECE MOVEMENT, AND TIMEPIECE

(71) Applicant: SEIKO EPSON CORPORATION, Tokyo (JP)

(72) Inventor: Takeo Funakawa, Chino (JP)

(73) Assignee: SEIKO EPSON CORPORATION (JP)

( * ) Notice: Subject to any disclaimer, the term of this patent is extended or adjusted under 35 U.S.C. 154(b) by 377 days.

(21) Appl. No.: 18/124,607

(22) Filed: Mar. 22, 2023

(65) Prior Publication Data

US 2023/0305497 A1 Sep. 28, 2023

(30) Foreign Application Priority Data

Mar. 23, 2022 (JP) ................................ 2022-046492

(51) Int. Cl.

| | |
|---|---|
| ***G04B 45/02*** | (2006.01) |
| ***G04B 13/02*** | (2006.01) |
| ***G04B 19/04*** | (2006.01) |
| ***G04B 19/12*** | (2006.01) |

(52) U.S. Cl.

CPC ............. *G04B 45/02* (2013.01); *G04B 13/02* (2013.01); *G04B 19/04* (2013.01); *G04B 19/12* (2013.01)

(58) Field of Classification Search

None

See application file for complete search history.

(56) References Cited

U.S. PATENT DOCUMENTS 4,599,251 A * 7/1986 Feller .................. C04B 41/5025 428/912.2
2014/0356638 A1* 12/2014 Wang ........................ G03F 7/20 204/192.27
2016/0378064 A1* 12/2016 Gandelhman .......... G04B 19/12 368/139
2017/0068221 A1 3/2017 Dubois
2020/0292991 A1* 9/2020 Miyashita .............. G04B 15/14
2021/0018875 A1* 1/2021 Funakawa ................ G04B 1/16

FOREIGN PATENT DOCUMENTS

JP 2017-053853 A 3/2017
JP 2020-148651 A 9/2020
JP 2021-015083 A 2/2021

* cited by examiner

*Primary Examiner* — Regis J Betsch
*Assistant Examiner* — Michael James Walker
(74) *Attorney, Agent, or Firm* — Harness, Dickey & Pierce, P.L.C.

(57) ABSTRACT

A timepiece component includes a base material including silicon as a main component, and a light reflecting layer formed on the base material and including a first silicon oxide layer, a silicon layer, and a second silicon oxide layer stacked in this order, when the light reflecting layer is viewed in plan view, the light reflecting layer includes a first region and a second region, and at least one of the thicknesses of the first silicon oxide layer in the first region and the second region and the thicknesses of the second silicon oxide layer in the first region and the second region is set such that the thicknesses are different from each other.

12 Claims, 12 Drawing Sheets

| AREA | THICKNESS OF FIRST LAYER [nm] ($SiO_2$) | THICKNESS OF SECOND LAYER [nm] (Si) | THICKNESS OF THIRD LAYER [nm] ($SiO_2$) | COLOR |
|---|---|---|---|---|
| FIFTH REGION | 150 | 110 | 70 | RED |
| SIXTH REGION | 220 | 75 | 140 | BLUE |
| SEVENTH REGION | 220 | 65 | 140 | PURPLE |

TIMEPIECE COMPONENT, TIMEPIECE MOVEMENT, AND TIMEPIECE

The present application is based on, and claims priority from JP Application Serial Number 2022-046492, filed Mar. 23, 2022, the disclosure of which is hereby incorporated by reference herein in its entirety.

BACKGROUND

1. Technical Field

The present disclosure relates to a timepiece component, a timepiece movement including the timepiece component, and a timepiece.

2. Related Art

Timepiece components are formed by machining metal materials in the related art, however in recent years, a base material including silicon has been used as a material for timepiece components due to its light weight and machinability.

In addition, timepiece components such as components that are exposed to the outside of the timepiece as well as components that are incorporated inside the timepiece have been required to have decorativeness in recent years.

For example, JP-A-2021-15083 discloses a technique for enhancing decorativeness of a gear incorporated in a timepiece. Specifically, the gear has a base material including silicon as a main component, and a light reflecting layer formed on the base material and including a first silicon oxide layer, a silicon layer, and a second silicon oxide layer stacked in this order, the light reflecting layer includes a first region and a second region when the light reflecting layer is viewed in plan view, and colors of the two regions are set to be different by differing a thickness of the silicon layer in the first region from a thickness of the silicon layer in the second region. In other words, colors are adjusted by differing the thicknesses of only the silicon layer.

However, there is room for improving the technique of JP-A-2021-15083. Specifically, since colors are set to be different by using the thicknesses of the silicon layer alone, there is limit on the range of color that can be realized.

In other words, there is a demand for a timepiece component having a wide range of color expression and excellent decorativeness.

SUMMARY

A timepiece component according to an aspect of the present application includes a base material including silicon as a main component, and a light reflecting layer formed on the base material and including a first silicon oxide layer, a silicon layer, and a second silicon oxide layer stacked in this order, wherein when the light reflecting layer is viewed in plan view, the light reflecting layer includes a first region and a second region, and at least one of the thicknesses of the first silicon oxide layer in the first region and in the second region or the thicknesses of the second silicon oxide layer in the first region and in the second region is different from each other.

A timepiece movement according to an aspect of the present application includes the timepiece component.

A timepiece according to an aspect of the present application has a see-through structure in which the timepiece component is visible.

DESCRIPTION OF EXEMPLARY EMBODIMENTS

First Embodiment

Overview of Timepiece

Figure 1:
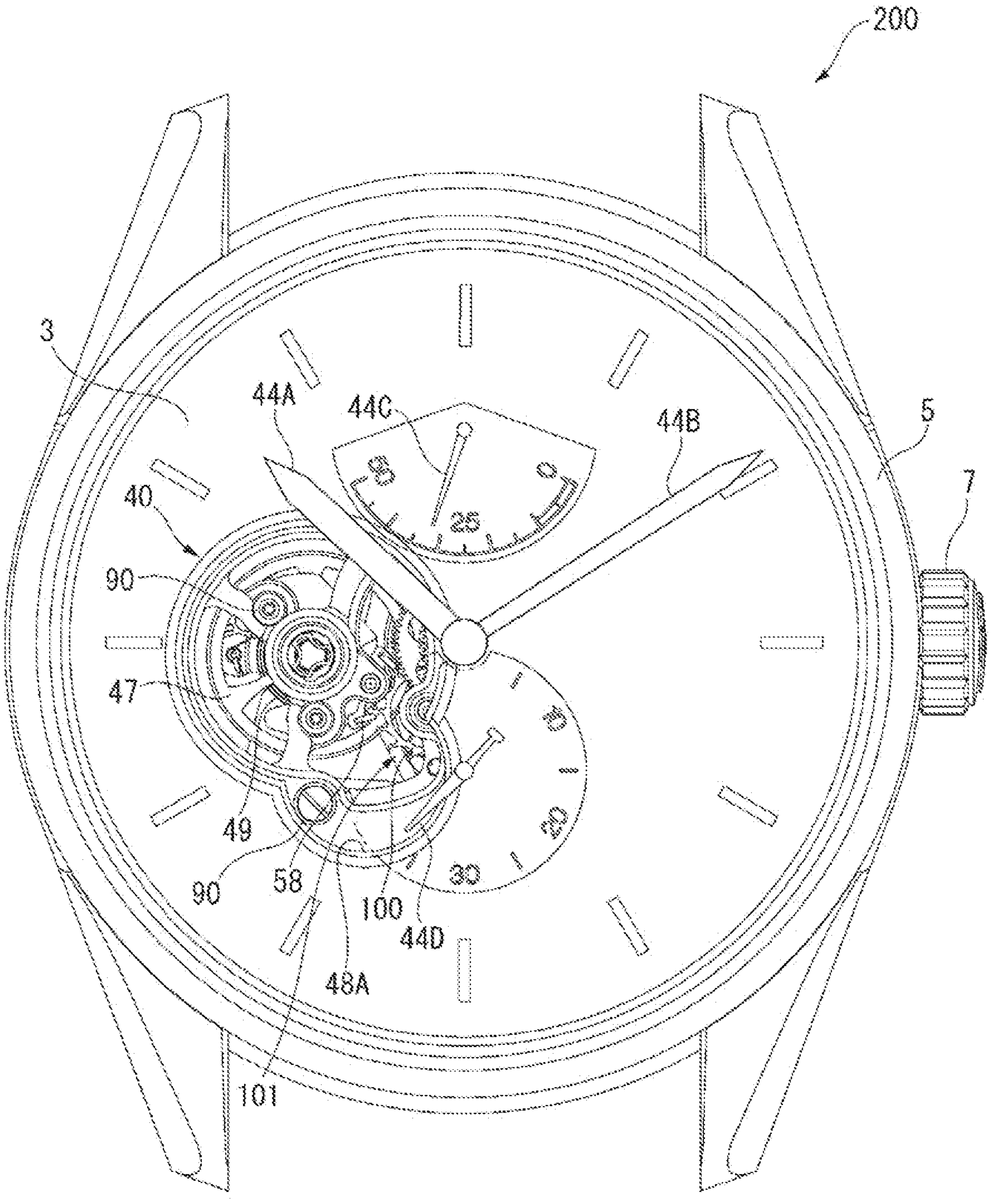
FIG. 1 illustrates a front view of a timepiece according to a first embodiment.
Figure 2:
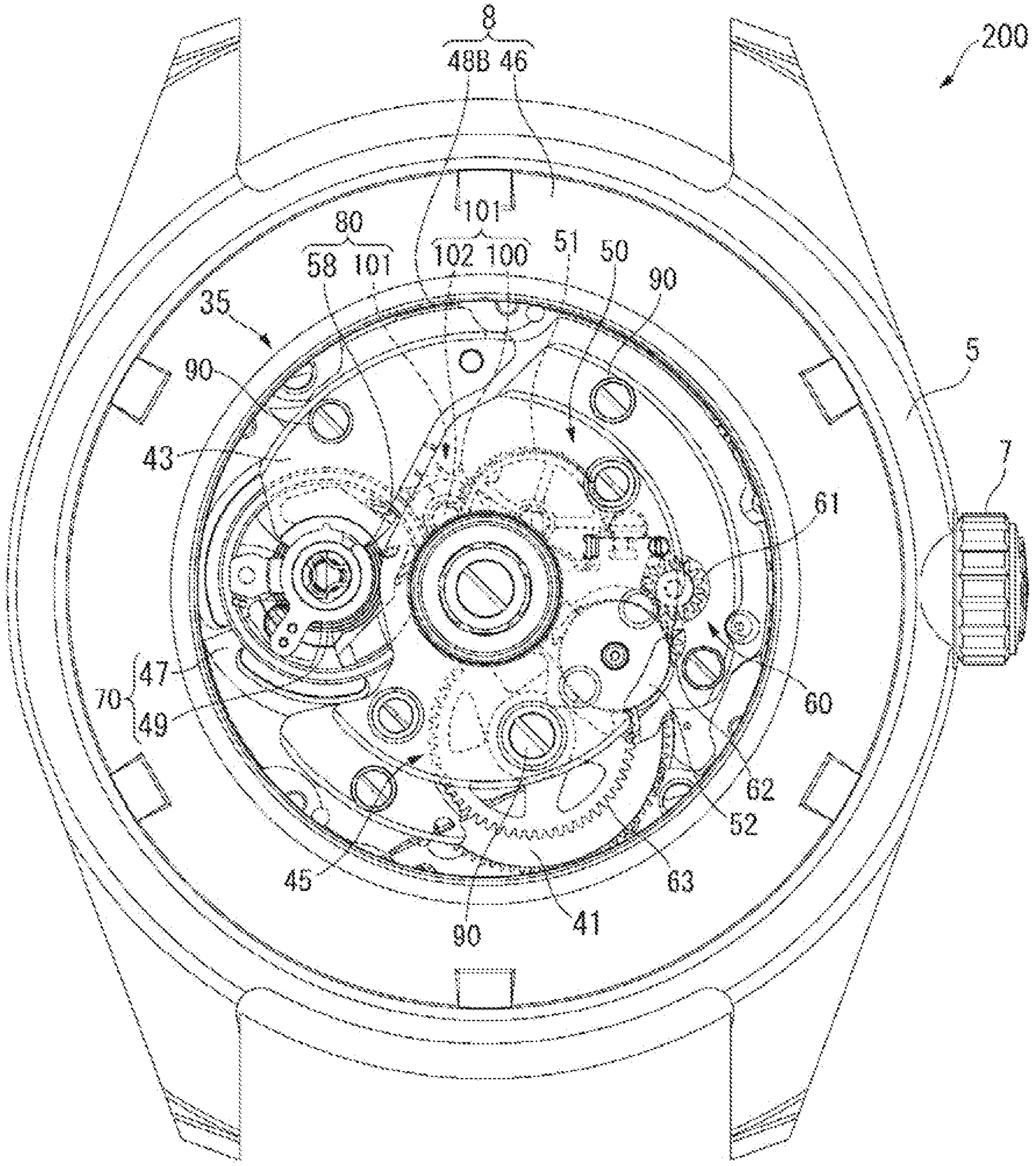
FIG. 2 is a rear view of the timepiece.

FIG. 1 is a front view of a timepiece. FIG. 2 is a rear view of the timepiece.

Exemplary embodiments of the present disclosure will be described below with reference to the accompanying drawings.

A timepiece 200 according to a first embodiment is an analog watch including an hour hand 44A and a minute hand 44B as illustrated in FIG. 1. The timepiece 200 is a mechanical timepiece and has a see-through structure in which part of a movement 35 is visible from a dial 3 side and a back cover 8 side (FIG. 2). Further, the see-through structure includes a structure in which a translucent member of such as glass is disposed on the back cover 8 and components of the movement 35 are visible through the back cover 8, and a structure in which the dial 3 has an opening and the components of the movement 35 are visible through the opening of the dial 3.

The timepiece 200 includes a cylindrical outer case 5, and a disk-shaped dial 3 is disposed on the inner circumference side of the outer case 5. The dial 3 includes a window 48A. The timepiece 200 is configured such that part of the movement 35 is visible through the window 48A.

Among two openings of the outer case 5, the opening on the front surface side is closed by a windshield, and the other opening on the back surface side has the back cover 8 (FIG. 2) attached thereto. Further, the outer case 5 is also called a body.

The timepiece 200 includes the movement 35 housed in the outer case 5, an hour hand 44A and a minute hand 44B that display time information, a power reserve hand 44C that indicates the duration of a mainspring, and a small second hand 44D.

The hour hand 44A, the minute hand 44B, the power reserve hand 44C, and the small second hand 44D are attached to a pointer shaft of the movement 35 and are driven by the movement 35.

A crown 7 is provided on a side surface of the outer case 5. By operating the crown 7, an input corresponding to an operation can be performed.

In FIG. 1, an escape wheel and pinion 101, a pallet fork 58, a balance wheel 47, a hairspring 49, a screw 90, and the like constituting a part of the movement 35 are visible from the dial 3 side through the window 48A provided on the dial 3. The escape wheel and pinion 101 includes an escape wheel gear 100 and a shaft member 102 as timepiece components.

The back cover 8 is constituted by a ring-shaped frame member 46 forming an outer circumference portion, and a window 48B formed of a transparent member fitted in the frame member 46 as illustrated in FIG. 2.

The movement 35 includes a train wheel 45, a balance rest 43, a manual winding mechanism 60, an automatic winding mechanism 50, and the like.

The train wheel 45 includes a movement barrel complete 41, a second wheel and pinion, a third wheel and pinion, a fourth wheel and pinion 51, the escape wheel and pinion 101, the pallet fork 58, the balance wheel 47, and the like provided on the back cover 8 side of a main plate. FIG. 2 illustrates the movement barrel complete 41, the fourth wheel and pinion 51, the escape wheel and pinion 101, the pallet fork 58, and the balance wheel 47. The escape wheel and pinion 101 and the pallet fork 58 constitute an escapement 80, and the balance wheel 47 and the hairspring 49 constitute a speed governor 70. Further, the speed governor 70 corresponds to a balance.

The manual winding mechanism 60 includes a winding stem, a winding pinion, a clutch wheel, a crown wheel 61, a ratchet transmission wheel 62, a ratchet wheel 63, and the like. In FIG. 2, the crown wheel 61, the ratchet transmission wheel 62, and the ratchet wheel 63 are illustrated.

The automatic winding mechanism 50 includes an oscillating weight, a bearing, an eccentric wheel, a pawl lever, a transmission wheel 52, and the like. In FIG. 2, the transmission wheel 52 is illustrated.

In FIG. 2, the movement barrel complete 41, the escape wheel and pinion 101, the pallet fork 58, the balance wheel 47, the crown wheel 61, the ratchet transmission wheel 62, the ratchet wheel 63, the eccentric wheel, the transmission wheel 52, and the like constituting a part of the movement 35 are observed through the window 48B provided in the back cover 8.

Further, a timepiece component is not limited to the escape wheel gear 100, and may be any component visible in a see-through structure. For example, the movement barrel complete 41, the wheels and pinions including the fourth wheel 51, the pallet fork 58, the speed governor 70 as a balance with hairspring, and the like are also included in timepiece components. In addition, timepiece components also include the dial 3 and hands including the hour hand 44A and the minute hand 44B that are visible through the windshield. In other words, a timepiece component is at least one of the movement barrel complete 41, a wheel and pinion, the escape wheel gear 100, the pallet fork 58, or the balance with hairspring. In addition, a timepiece component is at least one of the dial 3 or the hands.

Further, with respect to the timepiece 200, an aspect of a constituent component of the movement 35 that is visible from the dial 3 side or the back cover 8 side is not limited to the aspect described above.

For example, a desired constituent component of the movement 35 may be made visible by appropriately changing the design, size, arrangement position of the windows 48A and 48B, number of windows, and the like.

Furthermore, the entire dial 3 may be formed of a transparent member so that the entire movement 35 is visible from the dial 3 side, or the entire back cover 8 may be formed of a transparent member so that the entire movement 35 is visible from the back cover 8 side.

Configuration of Escape Wheel and Pinion

Figure 3:
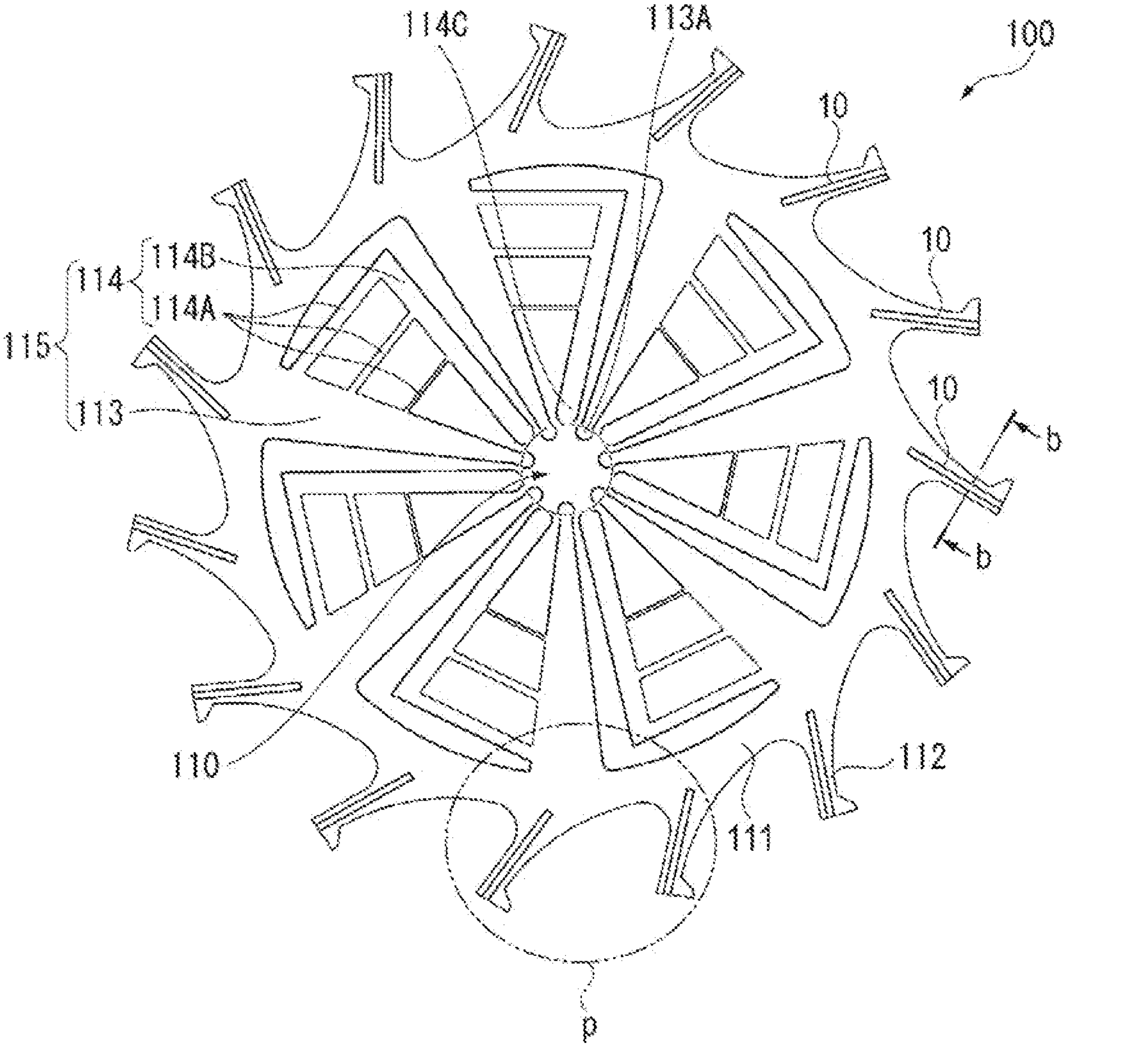
FIG. 3 is a plan view of an escape wheel gear.

FIG. 3 is a plan view of the escape wheel gear.

The escape wheel gear 100 has an insertion part 110 through which the shaft member 102 (FIG. 2) is inserted at the center. The escape wheel gear 100 has a rim portion 111 having a plurality of tooth portions 112, and holding portions 115 constituting the insertion part 110.

The rim portion 111 is an annular portion at the outer edge of the escape wheel gear 100. The tooth portions 112 protrude outward from the outer circumference of the rim portion 111 and are formed in a special hook shape.

The escape wheel gear 100 has seven holding portions 115. The holding portions 115 are arranged at seven positions in the circumferential direction of the annular rim portion 111 at an equal pitch of 360°/7. Further, the number of the holding portions 115 may be in the range of three to seven, or seven or greater, and is not particularly limited.

Each holding portion 115 has a first holding portion 113 extending from the rim portion 111 and a second holding portion 114 branching from the first holding portion 113. The first holding portion 113, the second holding portion 114, and the rim portion 111 are integrally formed of the same material.

The first holding portion 113 extends in the direction from the rim portion 111 toward the central portion, and is formed such that the width dimension thereof decreases toward the central portion. The tip of the first holding portion 113 on the central portion side is a contact portion 113A coming in contact with the shaft member 102 (FIG. 2). The contact portion 113A is formed in a planar arc shape.

The second holding portion 114 has first portions 114A and a second portion 114B. The second holding portion 114 has a function of fixing the shaft member 102 (FIG. 2) to the center portion of the escape wheel gear 100 and preventing the escape wheel gear 100 from tilting or coming off with respect to the shaft member 102.

The first portions 114A are coupled to the first holding portion 113, are formed to branch from the first holding portion 113, and extend in a direction intersecting with the extending direction of the first holding portion 113. The second holding portion 114 has a plurality of first portions 114A. The plurality of first portions 114A are disposed substantially parallel to each other. The second portion 114B is coupled to the plurality of first portions 114A and extends in the direction toward the central portion. The second portion 114B has a substantially constant width, and the tip on the central portion side serves as a contact portion 114C coming in contact with the shaft member 102 (FIG. 2). The contact portion 114C is formed in a planar arc shape.

Configuration of Light Reflecting Layer

Figure 4:
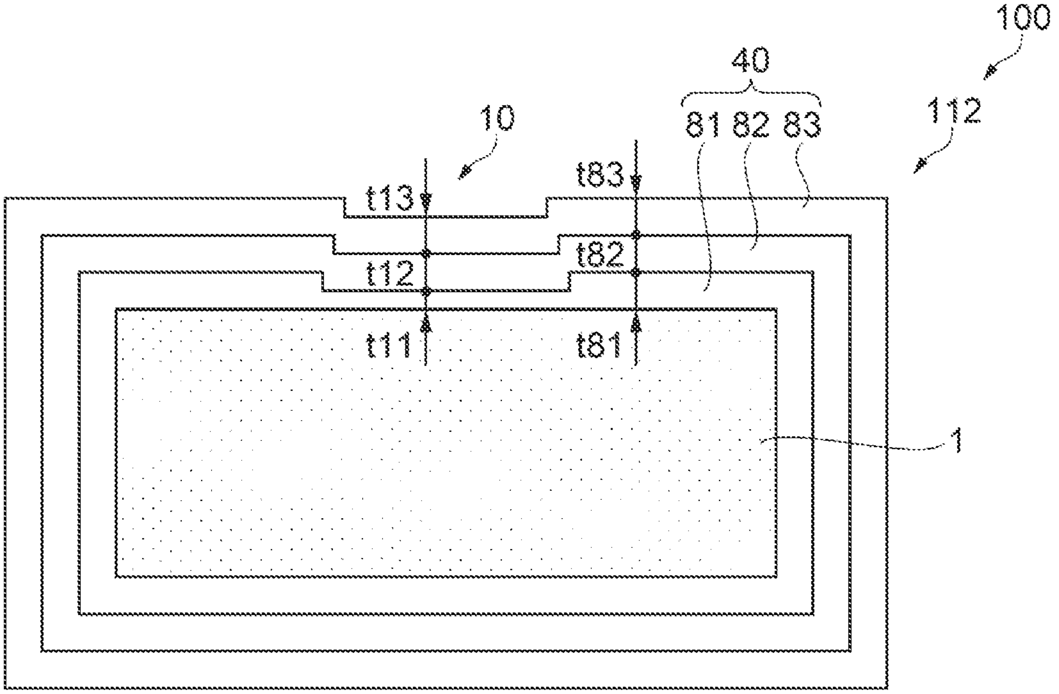
FIG. 4 is a cross-sectional view taken along line b-b of FIG. 3.

FIG. 4 is a cross-sectional view taken along line b-b of FIG. 3.

Linear portions 10 which are decorative lines are provided at the extending portion of each tooth portion 112 protruding outward from the rim portion 111 as illustrated in FIG. 3. Each linear portion 10 is an example of a second region, and is provided as an accent in design because it has a color different from the surrounding portion.

FIG. 4 illustrates a cross section of the extending portion of a tooth portion 112, and the escape wheel gear 100 has a configuration in which the light reflecting layer 40 is provided on the surface of a base material 1. The light reflecting layer 40 is provided on the entire circumference of the base material 1.

The base material 1 includes silicon as a main component. A type of silicon is not particularly limited, and an appropriate silicon can be selected from the viewpoint of machinability. Examples of silicon include single crystal silicon, polycrystalline silicon, and the like. These types of silicon may be used alone or in combination of two or more types. The weight of the escape wheel gear 100 is reduced when the base material 1 made of silicon is used, as compared to a case in which a base material made of metal is used. Furthermore, a complicated shape can be formed by using a photolithography technique and an etching technique.

The light reflecting layer 40 is formed on the base material 1 by stacking a first silicon oxide layer 81, a silicon layer 82, and a second silicon oxide layer 83 in this order. Further, a method of forming each layer will be described later.

Although a thickness t81 of the first silicon oxide layer 81 is adjusted according to the color to be developed, it is usually in the range of 100 nm or greater to 450 nm or less, and preferably in the range of 100 nm or greater to 400 nm or less. The thickness t81 of the first silicon oxide layer 81 is 100 nm or greater, it can be easily controlled. When the thickness t81 is 400 nm or less, the film formation time can be shortened, and thus productivity is improved.

The silicon layer 82 is provided on the first silicon oxide layer 81. Although the silicon layer 82 may be an amorphous layer or a polysilicon layer, it is preferably a polysilicon layer. Although a thickness t82 of the silicon layer 82 is adjusted according to the color to be developed, it is preferably in the range of 30 nm or greater to 150 nm or less. However, the thickness is not limited to this range.

The second silicon oxide layer 83 is provided on the silicon layer 82. Although a thickness t83 of the second silicon oxide layer 83 is adjusted according to the color to be developed, it is usually in the range of 5 nm or greater to 500 nm or less, and preferably in the range of 10 nm or greater to 500 nm or less.

The thickness of the light reflecting layer 40 in the linear portion 10 is different from the thickness of the surrounding portion as illustrated in FIG. 4. Specifically, a thickness t11 of the first silicon oxide layer 81 in the linear portion 10 is less than the thickness t81 of the surrounding first silicon oxide layer 81. On the other hand, a thickness t12 of the silicon layer 82 in the linear portion 10 is the same as the thickness t82 of the surrounding silicon layer 82. Likewise, a thickness t13 of the second silicon oxide layer 83 is the same as the thickness t83 of the surrounding second silicon oxide layer 83. That is, only the thickness t11 of the first silicon oxide layer 81 in the linear portion 10 is thinner, compared to those of the surrounding light reflecting layer 40. Further, a base portion in the surroundings of the linear portion 10 is referred to as a first region.

Formation Method of Light Reflecting Layer

FIGS. 5A to 5G are cross-sectional views showing the process of the formation step of the light reflecting layer. FIGS. 5A to 5G correspond to FIG. 4 and are cross-sectional views taken along line b-b in FIG. 3.

Next, a method of forming the light reflecting layer 40 including the linear portions 10 will be described.

Figure 5A:
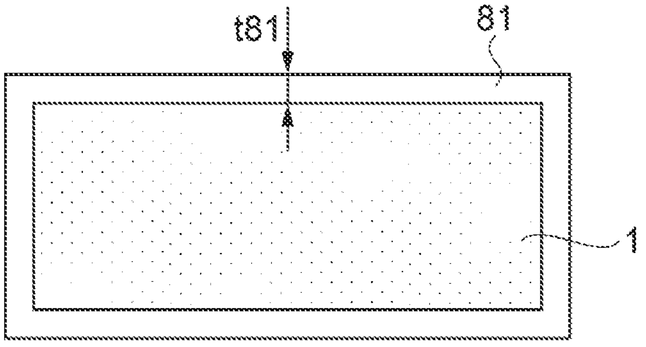
FIG. 5A is a cross-sectional view showing a process of a formation step of a light reflecting layer.

First, the first silicon oxide layer 81 is formed on the entire circumference of the base material 1 as shown in FIG. 5A. In a preferred example, the first silicon oxide layer 81 having the thickness t81 is formed on the base material 1 made of silicon by using a thermal oxidation method. Examples of the thermal oxidation method include a wet oxidation method using water, and a dry oxidation method using oxygen. Further, the method is not limited to a thermal oxidation method, and a physical vapor deposition method (PVD method), a chemical vapor deposition method (CVD method), a method in which these methods are combined, or the like may be used. Examples of the PVD method include a sputtering method, an ion plating method, and a vacuum deposition method. Examples of the CVD method include a plasma-enhanced chemical vapor deposition method, a thermal chemical vapor deposition method, and a photochemical vapor deposition method.

Figure 5B:
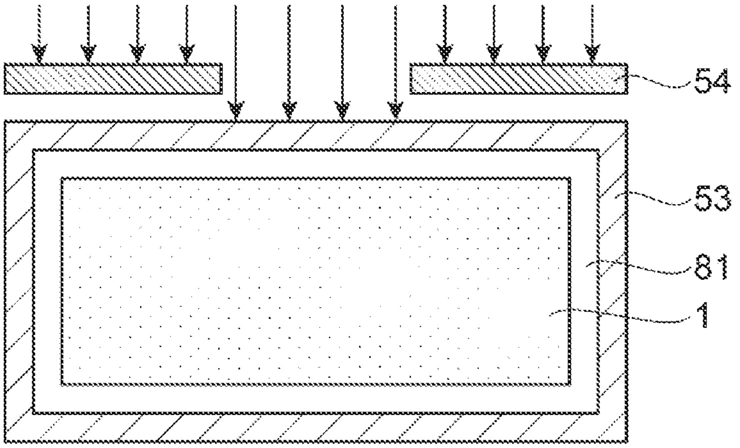
FIG. 5B is a cross-sectional view showing the process of the formation step of the light reflecting layer.

Next, for example, a known resist is applied to the entire surface of the first silicon oxide layer 81 to form a resist layer 53 as shown in FIG. 5B. In a preferred example, a positive resist is applied by using a spraying method. Further, a negative resist may be used.

Subsequently, the portion that will be the linear portion 10 is exposed to light through a mask 54 with an opening. Specifically, light is radiated to the resist layer 53 through the mask 54 to cause the resist layer to be exposed and transfer the pattern of the mask 54 as shown in FIG. 5B. The step shown in FIG. 5B corresponds to (a) exposure step.

Figure 5C:
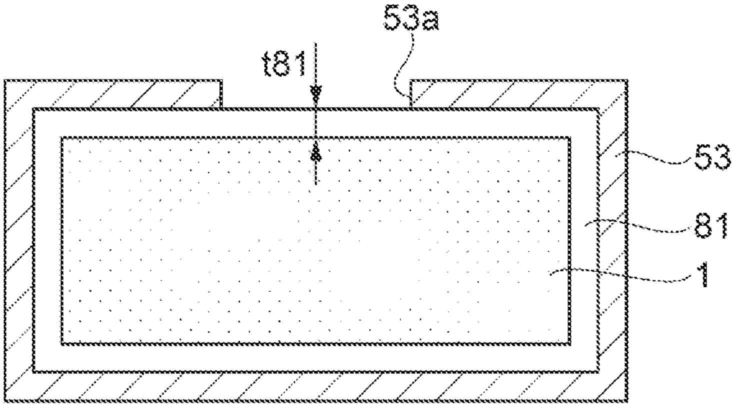
FIG. 5C is a cross-sectional view showing the process of the formation step of the light reflecting layer.

Next, the exposed resist layer 53 is developed and removed to form an opening 53*a* as shown in FIG. 5C. This step corresponds to (b) development step.

Figure 5D:
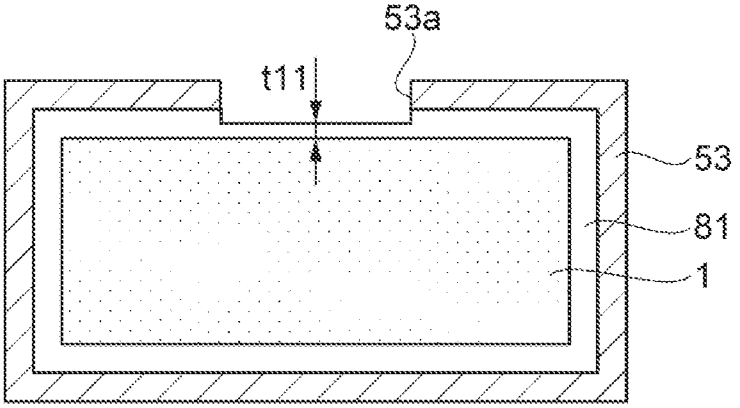
FIG. 5D is a cross-sectional view showing the process of the formation step of the light reflecting layer.

Next, the resist layer 53 is used as a mask to etch the first silicon oxide layer 81 exposed through an opening 53*a* as shown in FIG. 5D. In a preferred example, the first silicon oxide layer 81 is etched by using a dry etching method until the thickness thereof reaches the thickness t11. Further, a wet etching method may be used. This step corresponds to (c) etching step.

Figure 5E:
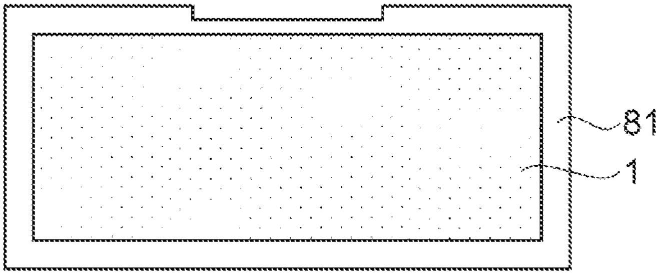
FIG. 5E is a cross-sectional view showing the process of the formation step of the light reflecting layer.

Then, the resist layer 53 is removed as shown in FIG. 5E.

Figure 5F:
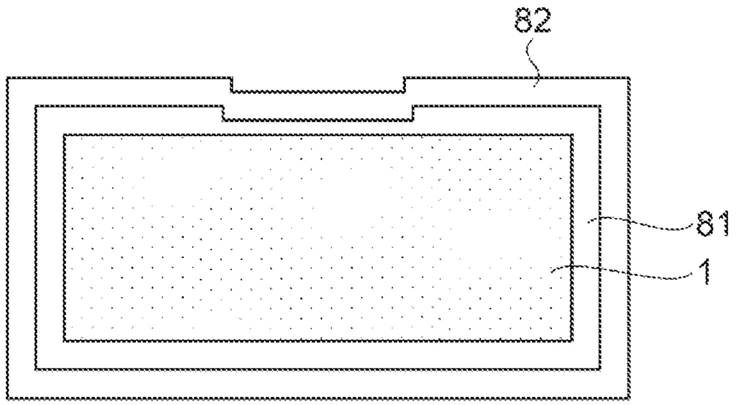
FIG. 5F is a cross-sectional view showing the process of the formation step of the light reflecting layer.

Next, the silicon layer 82 is formed on the entire surface of the first silicon oxide layer 81 as shown in FIG. 5F. In a preferred example, the silicon layer 82 is formed by using a low-pressure CVD method. In the low-pressure CVD method, for example, the silicon layer 82 is formed by controlling the film formation temperature in the range of 500° C. or higher to 700° C. or lower to flow a mono-silane gas under a low pressure. By forming the silicon layer 82 in the low-pressure CVD method, it is possible to control the layer quality of the silicon layer 82 from amorphous silicon to polysilicon according to the film formation temperature.

Figure 5G:
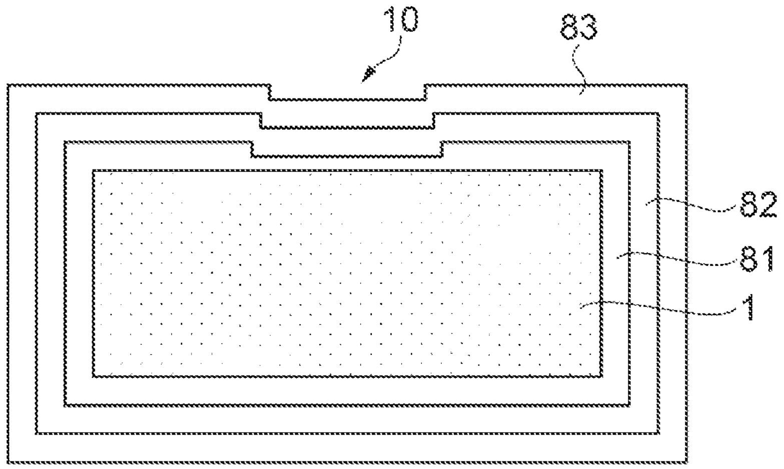
FIG. 5G is a cross-sectional view showing the process of the formation step of the light reflecting layer.

Next, the second silicon oxide layer 83 is formed on the entire surface of the silicon layer 82 as shown in FIG. 5G. In a preferred example, the second silicon oxide layer 83 is formed in the same method as the first silicon oxide layer 81.

Through the steps described above, the light reflecting layer 40 with the linear portion 10 illustrated in FIG. 4 is formed.

Light Reflecting Layer with Plurality of Regions

Figure 6:
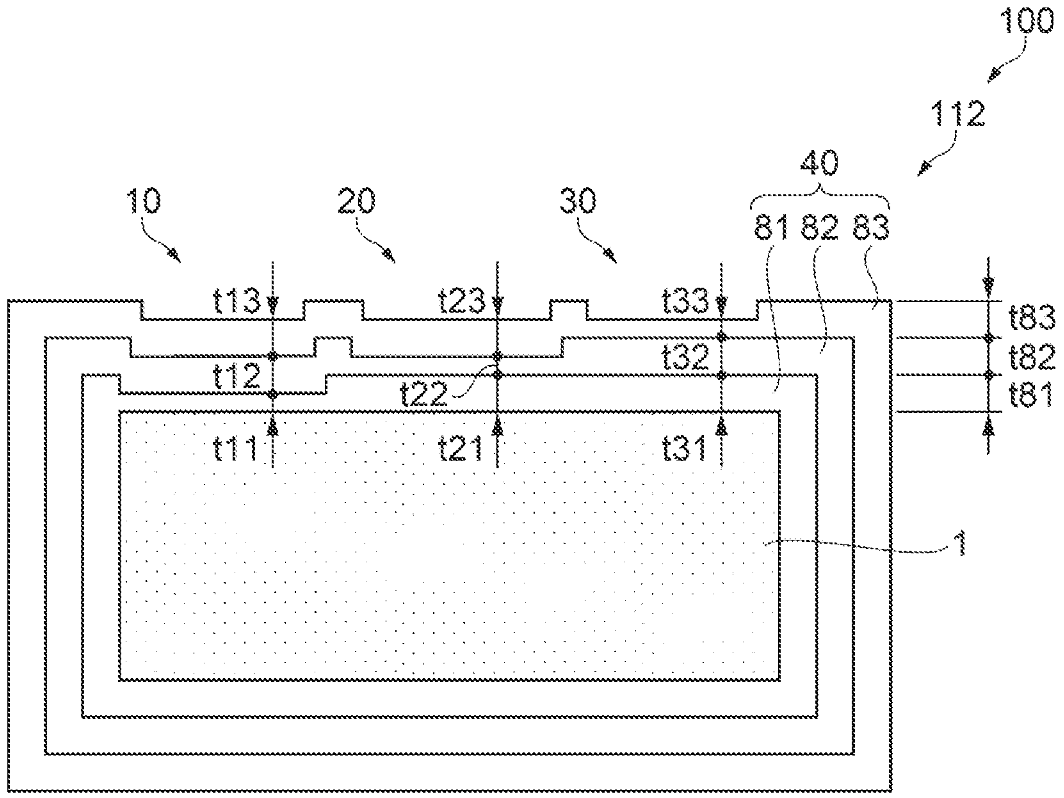
FIG. 6 is a cross-sectional view showing an example of the light reflecting layer having a plurality of regions.

FIG. 6 is a cross-sectional view illustrating an example of the light reflecting layer with a plurality of regions, and corresponds to FIG. 4.

Although an example of the light reflecting layer 40 including one linear portion 10 as a second region has been described in FIG. 4, the light reflecting layer 40 may include a plurality of regions.

The light reflecting layer 40 illustrated in FIG. 6 includes three regions having different layer thickness configurations. First, a second region is a region having the same layer thickness configuration as the linear portion 10 described above, and will be hereinafter referred to as a second region 10. A third region 20 is a region provided adjacent to the second region 10 and having a different layer thickness configuration. A fourth region 30 is a region provided adjacent to the third region 20 and having a different layer thickness configuration.

The third region 20 and the fourth region 30 are, for example, decorative lines similar to the linear portion 10, and three lines in different colors are arranged in a stripe shape. Hereinafter, the same portions as those described in FIG. 4 are given the same reference numerals, and overlapping description thereof will be omitted.

In the layer thickness configuration of the third region 20, a thickness t22 of the silicon layer 82 is less than a thickness t82 of the surrounding silicon layer 82. On the other hand, a thickness t21 of the first silicon oxide layer 81 is the same as a thickness t81 of the surrounding first silicon oxide layer 81. Likewise, a thickness t23 of the second silicon oxide layer 83 is the same as a thickness t83 of the surrounding second silicon oxide layer 83. That is, only the thickness t22 of the silicon layer 82 in the third region 20 is thinner, compared to those of the surrounding light reflecting layer 40.

The third region 20 can be formed in the same steps as those of the linear portion 10. Specifically, after the silicon layer 82 is formed, only the thickness t22 of the silicon layer 82 can be thinned by performing the above-described (a) exposing step, (b) development step, and (c) etching step on the portion that will be the third region 20.

In the layer thickness configuration of the fourth region 30, a thickness t33 of the second silicon oxide layer 83 is less than the thickness t83 of the surrounding second silicon oxide layer 83. On the other hand, a thickness t31 of the first silicon oxide layer 81 is the same as the thickness t81 of the surrounding first silicon oxide layer 81. Likewise, a thickness t32 of the silicon layer 82 is the same as the thickness t82 of the surrounding silicon layer 82. That is, only the thickness t33 of the second silicon oxide layer 83 in the fourth region 30 is thinner, compared to those of the surrounding light reflecting layer 40.

The fourth region 30 can be formed in the same steps as those of the linear portion 10. Specifically, after the second silicon oxide layer 83 is formed, only the thickness t33 of the second silicon oxide layer 83 can be thinned by performing the above-described (a) exposing step, (b) development step, and (c) etching step on the portion that will be the fourth region 30.

According to the light reflecting layer 40 of FIG. 6, three colors can be expressed by the second region 10, the third region 20, and the fourth region 30. Furthermore, when color of the first region in the surrounding base portion is added, four colors can be expressed. In other words, the first region to the fourth region will have different colors. In addition, the number of colors is not limited to four, and regions in more different colors may be provided.

Further, although the thickness of only one layer is changed in each region in the above description, the layer thicknesses of a plurality of layers may be changed in one region. According to this configuration, more various color expressions can be achieved.

In other words, the light reflecting layer 40 has the first region that is a base portion and the second region 10 when the light reflecting layer 40 is viewed in plan view. In addition, at least one of the thicknesses of the first silicon oxide layer 81 in the first region and the second region 10 or the thicknesses of the second silicon oxide layer 83 in the first region and the second region 10 is different from each other. Furthermore, the thickness of the silicon layer 82 in the first region may be different from the thickness of the silicon layer 82 in the second region 10.

In addition, when the light reflecting layer 40 is viewed in plan view, the light reflecting layer 40 further includes the third region 20, at least one of the thickness of the first silicon oxide layer 81 in the first region and the thicknesses of the first silicon oxide layer 81 in the third region 20, the thickness of the silicon layer 82 in the first region and the thickness of the silicon layer 82 in the third region 20, or the thickness of the second silicon oxide layer 83 in the first region and the thickness of the second silicon oxide layer 83 in the third region 20 is different from each other, and at least one of the thickness of the first silicon oxide layer 81 in the second region 10 and the thickness of the first silicon oxide layer 81 in the third region 20, the thickness of the silicon layer 82 in the second region 10 and the thickness of the silicon layer 82 in the third region 20, or the thickness of the second silicon oxide layer 83 in the second region 10 and the thickness of the second silicon oxide layer 83 in the third region 20 is different from each other.

Regarding Hue

It has been described above that the color of the second region 10, the color of the third region 20, and the color of the fourth region 30 are different from each other. A "different color" means that there is a difference in at least one of hue or chroma defined in the CIELAB color space. Further, hue and chroma are represented by color coordinates a* and b* in the CIELAB color space.

A hue angle ∠h° defined in the CIELAB color space is a parameter representing a hue calculated with Expression (1) by using the color coordinates a* and b* of the L*a*b* color space, which is a color space having a perceptually almost uniform rate recommended by the Commission Internationale de l'Eclairage (CIE) in 1976.

$$\text{"Hue angle } \angle h° = \tan{-1}(b^*/a^*)\text{"} \qquad \text{Expression (1)}$$

In addition, the hue angle ∠h° is an amount of correlation (also refer to 03087 of JISZ8113) of the hue calculated with Expression (11) of "4.2 Quantity Related to Each of Lightness, Chroma, and Hue" in "3.6 CIELAB1976ab Hue Angle" of "Colorimetry—Part 4: CIE1976L*a*b* Color Space" of Japanese Industrial Standards JISZ8781-4:2013, and "CIE1976L*a*b*" and "CIELAB" are said to be interchangeable.

Relationship Between Film Thickness and Color of Each Layer

Figure 7:
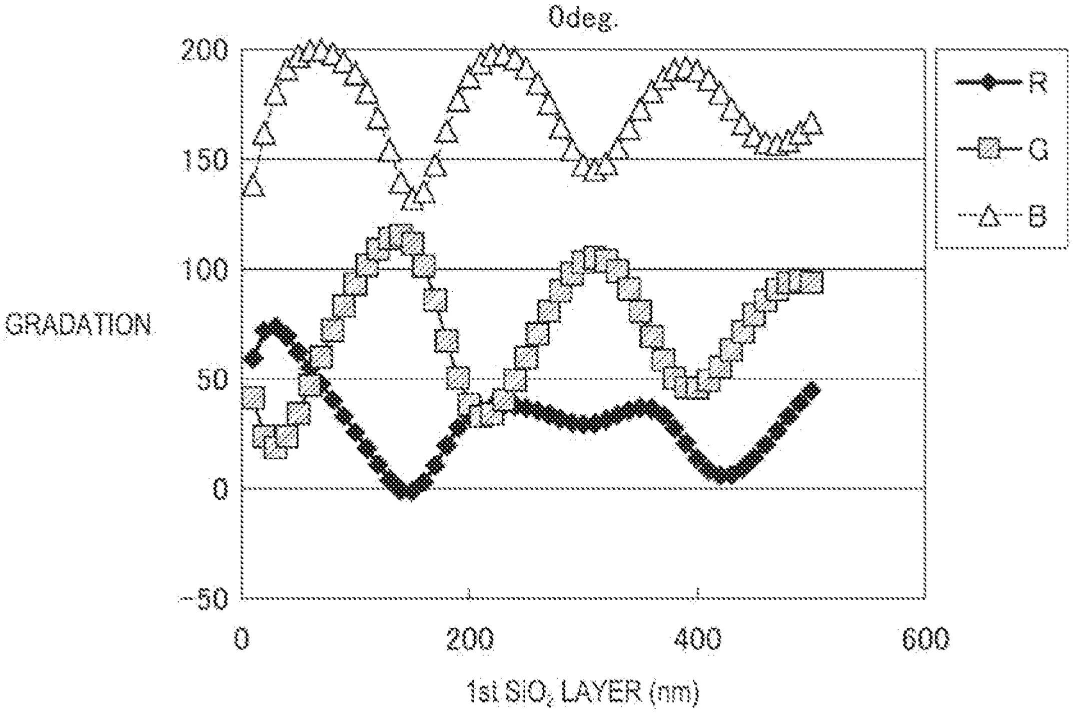
FIG. 7 is a graph showing a relationship between a thickness and gradations of a first silicon oxide layer.

FIG. 7 is a graph showing a relationship between a thickness and gradations of the first silicon oxide layer. In FIG. 7, the horizontal axis represents a thickness (nm) of the first silicon oxide layer 81, and the vertical axis represents gradation. Further, an observation angle is set to 0°, and gradations are indicated for each of R, G, and B.

In FIG. 7, the thickness of the first silicon oxide layers 81 is changed by 10 nm in the range of 10 nm or greater to 500 nm or less. On the other hand, the thickness of the silicon layer 82 is fixed to 76 nm, and the thickness of the second silicon oxide layer 83 is fixed to 140 nm.

A method for obtaining gradations of R, G, and B is as follows. A reflection spectrum was obtained from optical calculation using a refractive index n and an extinction coefficient k of the silicon-made base material 1, the first silicon oxide layer 81, the silicon layer 82, and the second silicon oxide layer 83 at a wavelength from 400 nm to 800 nm. Next, a reflectance R(λ) and a color matching function were converted into tristimulus values XYZ by using a known method, and then converted into R, G, and B values of 256 gradations. Further, gamma (γ) correction was not performed and γ=1 was set.

As shown in FIG. 7, it can be seen that the gradations of all of R, G, and B periodically change in accordance with the thickness of the first silicon oxide layer 81.

For example, since it is desirable to set B to 150 gradations or more and G and R to 100 gradations or less in order to develop blue, it can be seen from FIG. 7 that the thickness of the first silicon oxide layer 81 is preferably from 20 nm to 100 nm, from 180 nm to 290 nm, or from 330 nm to 500 nm. In particular, because there is a region where B indicates a high gradation and G and R indicate low gradation in the vicinity of a thickness of 220 nm, it is seen that the thickness of the first silicon oxide layer is more preferably 210 nm or greater and 280 nm or less.

Figure 8:
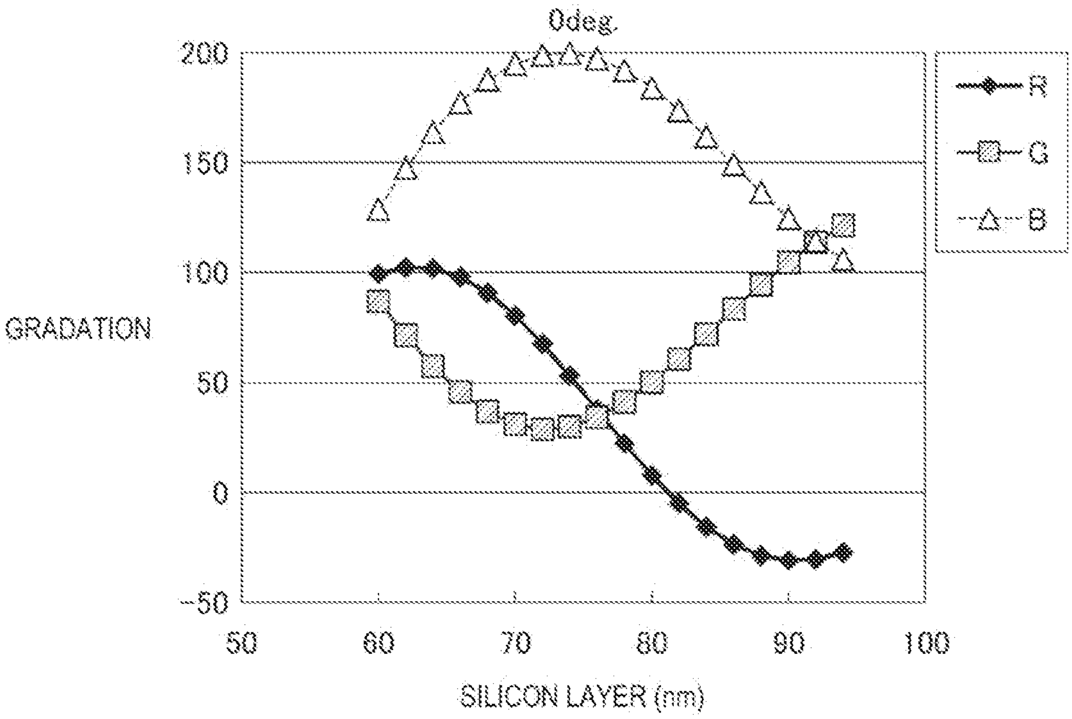
FIG. 8 is a graph showing a relationship between a thickness and gradations of a silicon layer.

FIG. 8 is a graph showing a relationship between the thickness and the gradations of the silicon layer, and corresponds to FIG. 7.

In FIG. 8, the horizontal axis represents a thickness (nm) of the silicon layer 82, and the vertical axis represents gradation. Further, an observation angle is set to 0°, and gradations are indicated for each of R, G, and B.

In FIG. 8, the thickness of the silicon layer 82 is changed by 2 nm in the range of 60 nm or greater to 94 nm or less. On the other hand, the thickness of the first silicon oxide layer 81 is fixed to 220 nm, and the thickness of the second silicon oxide layer 83 is fixed to 140 nm.

As shown in FIG. 8, it can be seen that the gradations of all of R, G, and B are greatly changed only by changing the thickness of the silicon layer 82 by about 5 nm, and the gradations are more greatly changed by changing the thickness of the silicon layer 82 by about 10 nm.

Figures 9, 10:
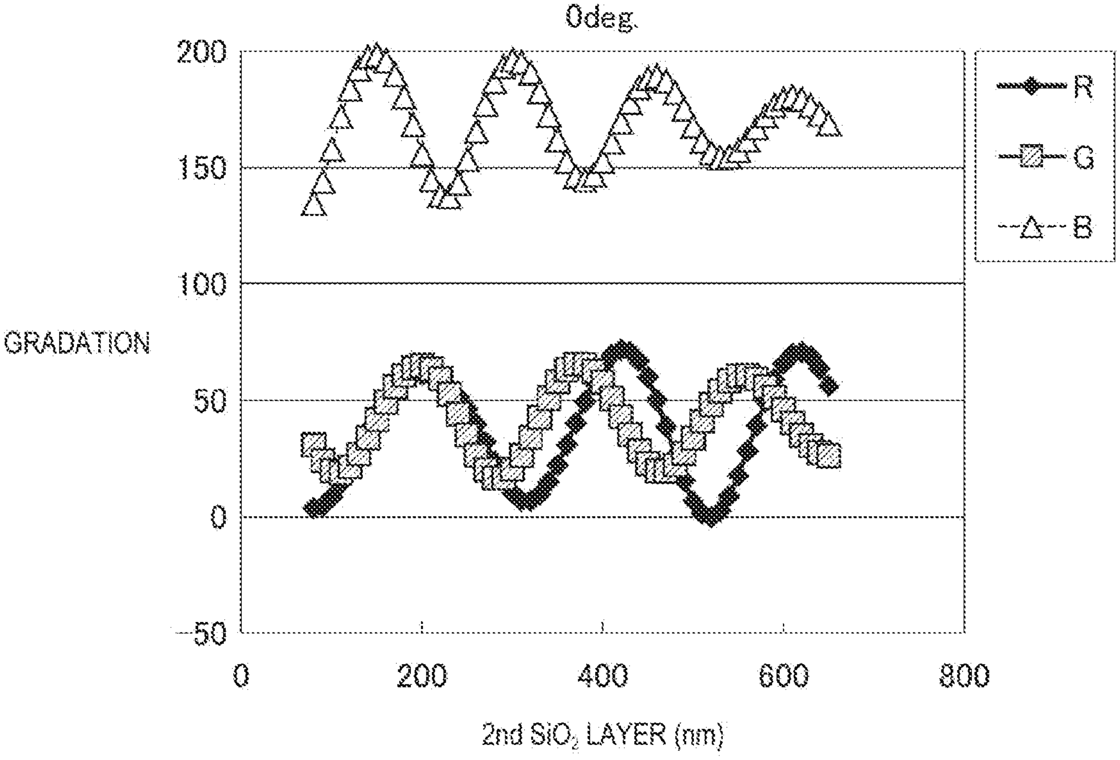
FIG. 9 is a graph showing a relationship between a thickness and gradations of a second silicon oxide layer.
FIG. 10 is a table showing aspects of colors of three regions having different layer thickness configurations.

FIG. 9 is a graph showing a relationship between the thickness and the gradations of the second silicon oxide layer, and corresponds to FIG. 7. In FIG. 9, the horizontal axis represents a thickness (nm) of the second silicon oxide layer 83, and the vertical axis represents gradation. Further, an observation angle is set to 0°, and gradations are indicated for each of R, G, and B.

In FIG. 9, the thickness of the second silicon oxide layers 83 is changed by 10 nm in the range of 80 nm or greater to 650 nm or less. On the other hand, the thickness of the first silicon oxide layer 81 is fixed to 220 nm, and the thickness of the silicon layer 82 is fixed to 76 nm.

As shown in FIG. 9, it can be seen that the gradations of all of R, G, and B periodically change in accordance with the thickness of the second silicon oxide layer 83.

For example, since it is desirable to set B to 150 gradations or more and G and R to 100 gradations or less in order to develop blue, it can be seen from FIG. 9 that the thickness of the second silicon oxide layer is preferably from 100 nm to 200 nm, from 250 nm to 360 nm, or from 400 nm to 550 nm.

As described in FIGS. 7 to 9, it can be seen that various colors can be expressed by changing the thicknesses of the first silicon oxide layer 81, the silicon layer 82, and the second silicon oxide layer 83.

EXAMPLES

FIG. 10 is a table showing aspects of colors of three regions having different layer thickness configurations.

A thickness of each layer in a fifth region, a sixth region, and a seventh region having different layer thickness configurations was set to the thickness shown in the table of FIG. 10, and the color of each region was checked.

In the fifth region, the thickness of the first silicon oxide layer 81 was set to 150 nm, the thickness of the silicon layer 82 was set to 110 nm, and the thickness of the second silicon oxide layer 83 was set to 70 nm. The color of the fifth region at an observation angle of 0° was red.

In the sixth region, the thickness of the first silicon oxide layer 81 was set to 220 nm, the thickness of the silicon layer 82 was set to 75 nm, and the thickness of the second silicon oxide layer 83 was set to 140 nm. The color of the sixth region at an observation angle of 0° was blue.

In the seventh region, the thickness of the first silicon oxide layer 81 was set to 220 nm, the thickness of the silicon layer 82 was set to 65 nm, and the thickness of the second silicon oxide layer 83 was set to 140 nm. The color of the seventh region at an observation angle of 0° was purple.

For example, as shown in FIG. 6, when the fifth region, the sixth region, and the seventh region are provided in the shape of three lines on the base material 1, stripe-shaped decorative lines in three colors of red, blue, and purple can be provided.

Further, although the recesses of the decorative line portions are shown to be large because FIG. 6 is a schematic illustration, the recesses are actually very small and do not affect the strength of the base material 1. For example, in the case of the escape wheel gear 100, while the thickness of the base material 1 is about 120 μm, the depth of the recesses of the decorative line portions is several tens of nm-order, which is within the range of error in the thickness of the base material 1 and does not affect the strength of the timepiece components.

According to the timepiece component and timepiece 200 of the present embodiment described above, the following advantages can be obtained.

The escape wheel gear 100 as a timepiece component has the base material 1 including silicon as a main component, and the light reflecting layer 40 formed on the base material 1 by stacking the first silicon oxide layer 81, the silicon layer 82, and the second silicon oxide layer 83 in this order, when the light reflecting layer 40 is viewed in plan view, the light reflecting layer 40 includes the first region as a base portion and the second region 10, and at least one of the thicknesses of the first silicon oxide layer 81 in the first region and the second region 10 or the thicknesses of the second silicon oxide layer 83 in the first region and the second region 10 is different from each other.

According to this configuration, when the second region 10 is the linear portion 10, for example, the thickness of the first silicon oxide layer 81 in the linear portion 10 is smaller than the thickness of the surrounding first silicon oxide layer 81. As a result, it is possible to provide a decorative line by the linear portion 10 having a color different from that of the surroundings in the extending portion of the tooth portion 112. Furthermore, the color of the linear portion 10 can be adjusted by changing the layer thickness.

Thus, it is possible to provide a timepiece component having a wide color expression range and excellent decorativeness. Furthermore, since the base material 1 is made of lightweight silicon and the recesses generated due to the change in the layer thickness is extremely small, various decorations can be applied without impairing the strength of the timepiece component. Thus, it is possible to provide a lightweight timepiece component having excellent decorativeness.

Therefore, it is possible to provide the well-designed timepiece 200 having excellent decorativeness.

Furthermore, the thickness of the silicon layer 82 in the first region may be different from the thickness of the silicon layer 82 in the second region 10.

According to this configuration, since the thickness of the silicon layer 82 is changed in addition to the thickness of the first silicon oxide layer 81, more various colors can be expressed.

In addition, when the light reflecting layer 40 is viewed in plan view, the light reflecting layer 40 further includes the third region 20, at least one of the thickness of the first silicon oxide layer 81 in the first region and the thicknesses of the first silicon oxide layer 81 in the third region 20, the thickness of the silicon layer 82 in the first region and the thickness of the silicon layer 82 in the third region 20, or the thickness of the second silicon oxide layer 83 in the first region and the thickness of the second silicon oxide layer 83 in the third region 20 is different from each other, and at least one of the thickness of the first silicon oxide layer 81 in the second region 10 and the thickness of the first silicon oxide layer 81 in the third region 20, the thickness of the silicon layer 82 in the second region 10 and the thickness of the silicon layer 82 in the third region 20, or the thickness of the second silicon oxide layer 83 in the second region 10 and the thickness of the second silicon oxide layer 83 in the third region 20 is different from each other. In other words, the first region to the third region have different colors.

According to this configuration, since the third region 20 exhibits a color different from that of the second region 10, it is possible to express three colors including that of the first region, and more various colors can be expressed.

In addition, a timepiece component is at least one of the movement barrel complete 41, wheels and pinions, the escape wheel gear 100, the pallet fork 58, or the balance with hairspring.

According to this configuration, it is possible to provide a timepiece component having excellent decorativeness.

In addition, the timepiece component may be at least one of the dial 3 or the hands.

According to this configuration, it is possible to provide a timepiece component having excellent decorativeness.

In addition, the timepiece 200 includes the timepiece component described above, and has a see-through structure in which the timepiece component is visible.

According to this configuration, it is possible to provide the well-designed timepiece 200 with the see-through structure in which internal timepiece components are used as elements of design.

Second Embodiment

Different Decorative Aspect

Figure 11:
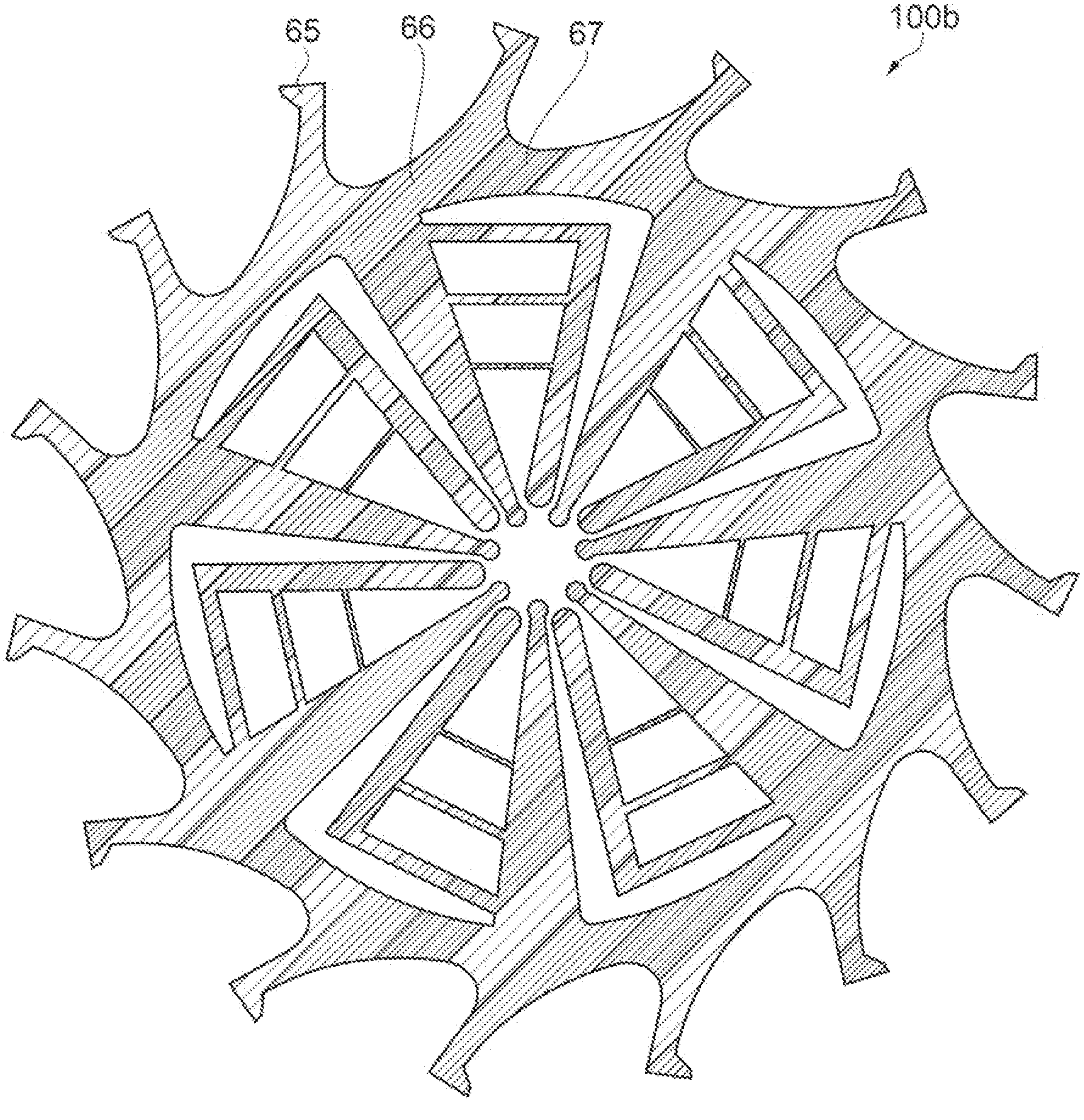
FIG. 11 is a plan view of an escape wheel gear according to a second embodiment.

FIG. 11 is a plan view of an escape wheel gear according to a second embodiment, and corresponds to FIG. 3.

Although the linear portion 10 which is a decorative line is provided in the extending portion of the tooth portion 112 in the above-described embodiment, the present disclosure is not limited to this configuration, and any decorative aspect according to design may be employed. For example, in an escape wheel gear 100*b* of the present embodiment, an oblique stripe-shaped decorative line is applied to the entire gear. The same constituent portions as those in the above-described embodiment are given the same reference signs, and overlapping description thereof will be omitted.

In the escape wheel gear 100*b*, oblique stripe-shaped decorative lines are provided over the entire gear, and the decorative line has a pattern in which three types of lines including a first red line 65, a second blue line 66, and a third purple line 67 are repeated in this order.

The first line 65 has the layer thickness configuration of the fifth region of FIG. 10 and exhibits red. The second line 66 has the layer thickness configuration of the sixth region of FIG. 10 and exhibits blue. The third line 67 has the layer thickness configuration of the seventh region of FIG. 10 and exhibits purple. Further, the color of each line is an example, and other colors may be used. In addition, the present disclosure is not limited to oblique lines, and various design details can be adopted according to the entire design concept of the timepiece 200.

As a result, the entire escape wheel gear 100*b* is vividly decorated with three-color oblique stripe lines formed by the first lines 65, the second lines 66, and the third lines 67.

Figure 12:
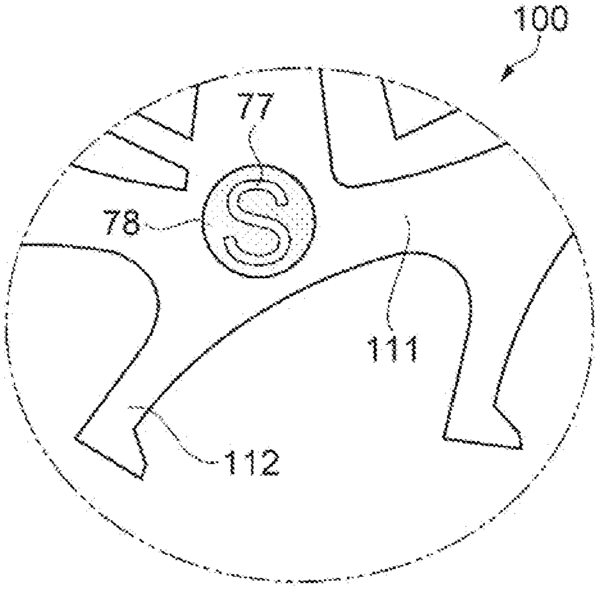
FIG. 12 is an enlarged view of the portion p of FIG. 3.

FIG. 12 is an enlarged view of the portion p of FIG. 3. FIG. 12 is an enlarged view of the surroundings of a tooth portion 112 of the escape wheel gear 100, and an S-shaped mark 77 is provided on the rim portion 111. A circular region 78 is provided around the mark 77. In a preferred example, the base portion of the escape wheel gear 100 is blue, the mark 77 is red, and the circular region 78 is purple. The base portion has the layer thickness configuration of the sixth region in FIG. 10, the mark 77 has the layer thickness configuration of the fifth region, and the circular region 78 has the layer thickness configuration of the seventh region.

In this manner, character information such as a mark or a logo can be vividly inserted in the timepiece component in a variety of colors. Further, although the decorative lines and the character information are described as being provided on the surface of the base material 1 in the above description, the lines and information are not limited to being provided on the surface, and may be provided on the back surface or a side surface of the base material 1 as long as the provision surface is any surface on which the light reflecting layer 40 is provided, for example. According to this configuration, more various decorations can be applied.

What is claimed is:

1. A timepiece component comprising:

a base material including silicon as a main component; and a light reflecting layer formed on the base material and including a first silicon oxide layer, a silicon layer, and a second silicon oxide layer stacked in this order, wherein when the light reflecting layer is viewed in a direction normal to a plane defined by the light reflecting layer, the light reflecting layer includes a first region and a second region, and a thickness of the first silicon oxide layer in the first region and in the second region is different from each other.

2. The timepiece component according to claim 1, wherein, furthermore, a thickness of the silicon layer in the first region is different from a thickness of the silicon layer in the second region.

3. The timepiece component according to claim 1, wherein when the light reflecting layer is viewed in plan view, the light reflecting layer further includes a third region, at least one of thicknesses of the first silicon oxide layer in the first region and in the third region, thicknesses of the silicon layer in the first region and in the third region, or thicknesses of the second silicon oxide layer in the first region and in the third region is different from each other, and at least one of thicknesses of the first silicon oxide layer in the second region and in the third region, thicknesses of the silicon layer in the second region and in the third region, or thicknesses of the second silicon oxide layer in the second region and in the third region is different from each other.

4. The timepiece component according to claim 3, wherein colors in the first to third regions are different.

5. The timepiece component according to claim 4, wherein a decoration is provided, the decoration including a first color expressed by the first region, a second color expressed by the second region, and a third color expressed by the third region.

6. The timepiece component according to claim 5, wherein the decoration includes a three-color stripe line, and the three-color stripe line includes a first line formed by the first region, a second line formed by the second region, and a third line formed by the third region.

7. The timepiece component according to claim 5, wherein the decoration includes a base, a mark provided in the base, and a portion provided in the base and in a surrounding of the mark, the base is formed by any one of the first region, the second region, and the third region, the mark is formed by a region, of the first to third regions, different from the region forming the base, and the surrounding of the mark is formed by a region, of the first to third regions, different from the region forming the base and the region forming the mark.

8. The timepiece component according to claim 1, wherein the timepiece component is at least one of a movement barrel complete, a wheel and pinion, an escape wheel and pinion, a pallet fork, or a balance with hairspring.

9. The timepiece component according to claim 1, wherein the timepiece component is at least one of a dial or a hand.

10. A timepiece movement including the timepiece component according to claim 1.

11. A timepiece including the timepiece component according to claim 1.

12. The timepiece according to claim 11, wherein the timepiece has a see-through structure configured to cause the timepiece component to be visible.

* * * * *